United States Patent
Miyazaki et al.

(10) Patent No.: US 6,652,199 B2
(45) Date of Patent: Nov. 25, 2003

(54) VESSEL CONVEYING SYSTEM

(75) Inventors: Kazuo Miyazaki, Tokyo (JP); Norimi Kawanami, Tokyo (JP); Takao Katayama, Tokyo (JP); Masahito Yamamoto, Ishikawa-ken (JP); Tatsuhiro Nakada, Ishikawa-ken (JP)

(73) Assignees: Dai Nippon Printing Co., Ltd., Tokyo (JP); Shibuya Kogyo Co., Ltd., Ishikawa-ken (JP)

( * ) Notice: Subject to any disclaimer, the term of this patent is extended or adjusted under 35 U.S.C. 154(b) by 0 days.

(21) Appl. No.: 10/125,335

(22) Filed: Apr. 18, 2002

(65) Prior Publication Data

US 2002/0152632 A1 Oct. 24, 2002

(30) Foreign Application Priority Data

Apr. 19, 2001 (JP) ........................................ 2001-121709

(51) Int. Cl.[7] .............................................. B65G 51/24
(52) U.S. Cl. ........................... 406/181; 406/31; 198/950
(58) Field of Search ............................. 406/29, 31, 181; 209/925; 198/950

(56) References Cited

U.S. PATENT DOCUMENTS

| 4,697,691 A | | 10/1987 | Zodrow et al. | |
| 5,388,705 A | * | 2/1995 | Fine et al. | 209/524 |
| 5,406,772 A | * | 4/1995 | Dinius | 53/67 |
| 5,549,421 A | * | 8/1996 | Reinhardt et al. | 406/3 |
| 6,183,358 B1 | * | 2/2001 | Adair, Jr. | 454/187 |
| 6,513,643 B2 | * | 2/2003 | Nakada | 198/379 |

FOREIGN PATENT DOCUMENTS

| EP | 0 758 624 A1 | 2/1997 |
| JP | 56-52256 | 12/1981 |
| JP | 090 58862 | 3/1997 |
| JP | P2001-233448 A | 8/2001 |
| JP | 2001-233448 | 8/2001 |

* cited by examiner

Primary Examiner—Joseph A. Dillon
(74) Attorney, Agent, or Firm—Flynn, Thiel, Boutell & Tanis, P.C.

(57) ABSTRACT

A vessel conveying system includes a dryer disposed within a first sterile chamber. If a vessel stays within the dryer for a prolonged length of time, it will be deformed under heat. Accordingly, the vessel is removed by a reject wheel and dropped onto a discharge chute disposed below. A downstream portion of the discharge chute is surrounded by a second sterile chamber, which is separate from the first mentioned sterile chamber, A glove mounted on the wall of the second chamber enables access to the discharge chute while maintaining the chute in a sterile condition. A door is mounted on the wall of the second chamber, and the rejected vessel is discharged through the door. The sterile chambers are disposed within a processing chamber. The pressure within the first chamber is controlled to be higher than the pressure (atmospheric pressure) within the processing chamber and the pressure within the second chamber is controlled to be lower than the atmospheric pressure. As a consequence, a vessel rejected by the reject wheel can be removed without destroying an internal ambience of the sterile chamber surrounds the reject wheel.

7 Claims, 4 Drawing Sheets

VESSEL CONVEYING SYSTEM

BACKGROUND OF THE INVENTION AND RELATED ART STATEMENT

The present invention relates to a vessel conveying system, and in particular, to a vessel conveying system which includes reject means for selectively discharging a vessel at a reject position located in the course of a conveying path for vessels.

A vessel processing line including conveying means such as conveyors on which a multitude of vessels are continuously conveyed to be successively introduced into a variety of vessel processors for purpose of processing the vessels is extensively in use. Arrangements are known in the art in which each vessel processor of the line is confined in a closed sterile chamber so that the processing of each vessel takes place in a sterile environment.

However, in a vessel processing line in which vessels are processed while they are being continuously conveyed, in the event of a failure or outage of a processor for a prolonged length of time, the vessels must be cleared from the processor. Accordingly, a rejector or rejectors are usually provided along the vessel conveying path of the line to allow the vessels to be rejected whenever necessary.

When externally discharging the rejected vessels from the vessel processor in an arrangement in which each vessel processor is disposed within a sterile chamber, it is necessary to avoid destroying the sterile environment in the sterile chamber. Depending on the requirement of the processing applied in each vessel processor, allowing the ambience within the sterile chamber to be released outside may be hazardous to the health of human beings. In such instance, it is necessary to take the vessels which are rejected in the course of the vessel conveying path to the outside of the chamber without opening the chamber in which the reject means is provided. However, there is no known arrangement which allows the vessels to be discharged while maintaining the sterile ambience within the sterile chamber in which the rejector is provided.

OBJECT AND SUMMARY OF THE INVENTION

Accordingly, it is an object of the present invention to provide a vessel conveying system in which vessels are supplied to vessel processors disposed within a sterile chamber to be processed and then discharged to be fed to a succeeding step, and in particular, a vessel conveying system including a rejector or rejectors which selectively reject vessels in the course of a conveying path, which allows vessels rejected by the rejector or rejectors to be discharged to the outside of a sterile chamber while maintaining a sterile ambience in the sterile chamber.

Above object is accomplished by a vessel conveying system including reject means which selectively discharges a vessel at a reject position located in the course of a conveying for vessels and comprising a discharge chute for receiving a vessel discharged by the reject means from the conveying path to convey it downstream, a first chamber surrounding the reject means, and a second chamber extending from the first chamber to the outside and surrounding a downstream portion of the discharge chute, the second chamber including a glove which can be brought into contact with the discharge chute while maintaining a sterile condition thereof and a door which can be opened and closed and through which a vessel is discharged from the downstream end of the discharge chute.

In the described vessel conveying system, a vessel which is rejected in the course of the conveying path for vessels by the reject means disposed within the first chamber is received by the discharge chute to be conveyed downstream where it is surrounded by the second chamber. After the rejected vessel has been moved from the first chamber in which the reject means is disposed to a separate, second chamber in which the discharge chute is disposed, the vessel is discharged through an open door of the second chamber. In this manner, the rejected vessel can be simply taken out of the sterile chamber without detracting from the ambience within the first chamber in which the reject means is provided. The provision of the glove in the second chamber which surrounds the downstream portion of the discharge chute allows an access from the outside while maintaining the sterile condition if a trouble occurs within the discharge chute.

It is another object of the present invention to provide a vessel conveying system which prevents the ingress of an external ambience into the first chamber in which the reject means is disposed and which also prevents the discharge of an ambience within the first chamber and any upstream chamber to the exterior.

Such object is accomplished by providing a pressure control means for controlling the pressures in the first and the second chamber, the pressure control means operating so that the pressure within the first chamber is maintained higher than a pressure which prevails outside the first and the second chamber and the pressure within the second chamber is lower than the pressure which prevails outside the first and the second chamber.

With the vessel conveying system according to the present invention, the interior of the first chamber in which the reject means is disposed is controlled to a higher pressure, thus preventing the ingress of the ambience outside the first chamber or within the second chamber while the second chamber in which the downstream portion of the discharge chute is disposed is controlled to be a lower pressure than the outside of the first or the second chamber, preventing the ambience within the first chamber or any upstream chamber from flowing externally through the second chamber.

DETAILED DESCRIPTION OF PREFERRED EMBODIMENT

Figure 4:
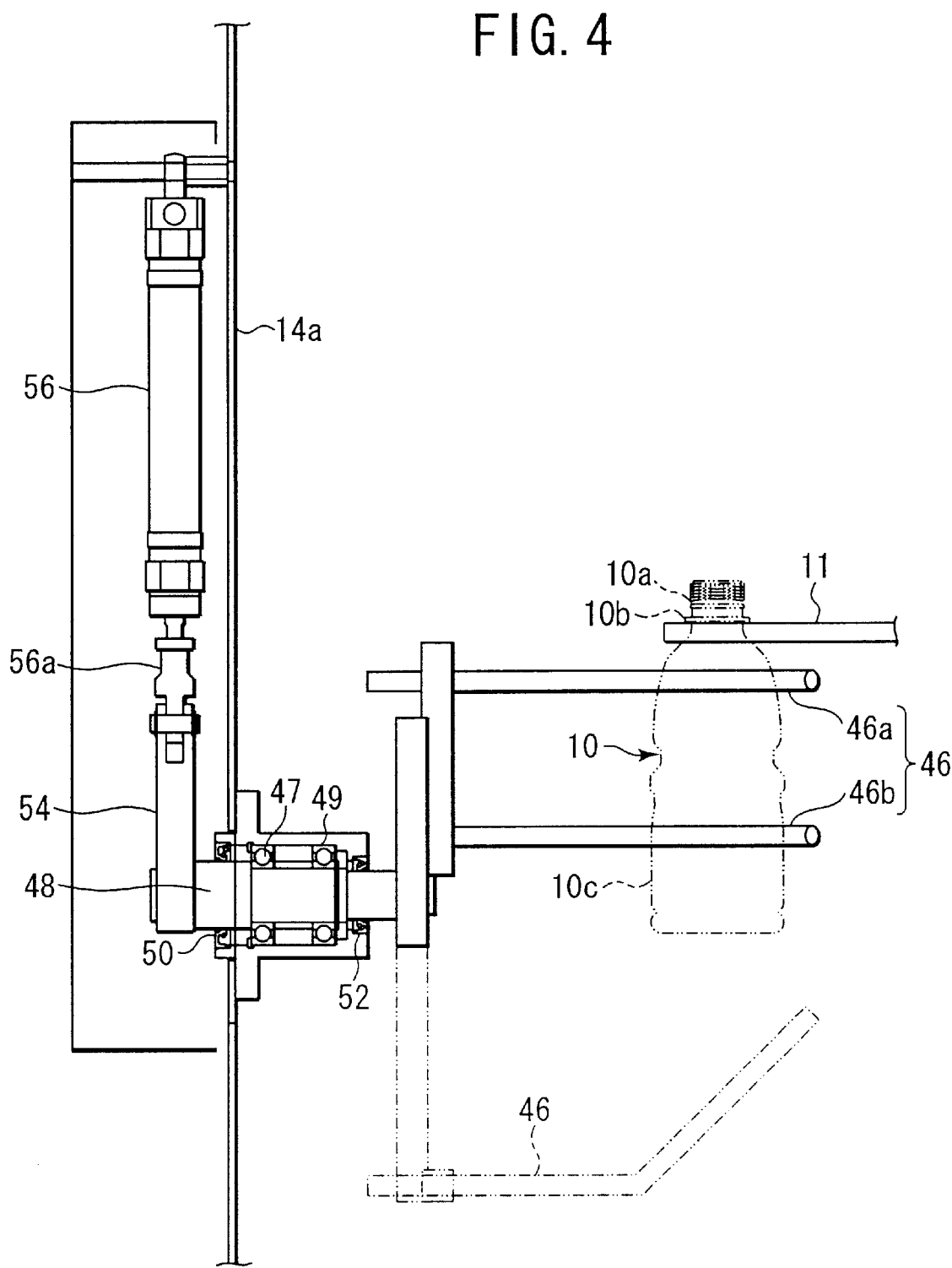
FIG. 4 is a front view of a reject arm of the vessel conveying system.

Referring to the drawings, an embodiment of the invention will be described. The vessel conveying system is designed to convey resin vessels such as PET bottles on an air conveyor 2 into a processing chamber 4 in which a rinser 6 and a drier 8 are sequentially disposed where given processings are applied to the vessels to be returned subsequently to the air conveyor 2 again so as to be fed to a subsequent step, not shown. A vessel 10 which is conveyed by the present system is a PET bottle formed of a resin, as shown in FIG. 4 which will be described later, and includes a neck 10a, around which a flange 10b is formed. A neck conveyance takes place on the basis of the elevation of the flange 10b. The processing chamber 4 in which the rinser 6 and the drier 8 are disposed is a usual open chamber and assumes an atmospheric pressure.

A sterile chamber 12 and a sterile chamber 14 are disposed in succession within the processing chamber 4 for containing the rinser 6 which rinses the resin vessels 10 and the drier 8 which dries the rinsed resin vessels 10, respectively. The air conveyor 2 passes through an inlet sterile chamber 16 which is connected the upstream end of the processing chamber 4 to be introduced into the processing chamber 4, then passes through the rinser chamber 12 and the drier chamber 14, and then passes through an outlet sterile chamber 18 which is connected to the downstream end of the processing chamber 4 so as to be connected to a next, downstream step.

The resin vessel 10 which is conveyed on the air conveyor 2 is introduced into the rinser 6 disposed within the sterile rinser chamber 12 through an inlet wheel 20. When introduced into the rinser 6, the resin vessel 10 is rinsed while it is rotatively conveyed by being retained by a gripper, not shown, and dripped off and then discharged through an outlet wheel 22 to be handed over to the air conveyor 2 again.

The rinsed resin vessel 10 is conveyed on the air conveyor 2 into the sterile drier chamber 14 where it is conveyed into the drier 8 through a second inlet wheel 24. While not shown, a plurality of unlockable gripper means which open or close by causing either one or both of a pair of grip members to rock are disposed at an equal circumferential interval along the outer periphery of the second inlet wheel 24, and the resin vessel 10 which is conveyed by the air conveyor 2 by having its lower surface of the flange 10b supported is engaged by the unlockable gripper means at a location above the flange 10b to be handed over to the drier 8.

A plurality of resilient gripper means 11 (see FIG. 4 where one of them is schematically shown) are disposed at an equal circumferential interval around the drier 8, and each resilient gripper means 11 includes a pair of arms which are resiliently urged as by a spring toward each other to hold the neck 10a of the vessel 10 therebetween. The resilient gripper means 11 holds the resin vessel 10 which is handed over from the unlockable gripper means on the second inlet wheel 24 while the vessel is being conveyed. The sterile chamber 14 in which the drier 8 is disposed is supplied with heated dry air, whereby the resin vessel 10 which is rinsed by the rinser 6 is dried up while its neck 10a is gripped by the resilient gripper means 11 on the drier 8.

The resin vessel 10 which is dried up in the drier 8 is handed over to the air conveyor 2 through a second outlet wheel 26 to be fed to a subsequent step. The second outlet wheel 26 is also provided with a plurality of unlockable gripper means which are disposed at an equal circumferential interval in the similar manner as on the second inlet wheel 24, and each unlockable gripper means on the second outlet wheel grips and takes out the resin vessel 10 which has been gripped by the resilient gripper means 11 on the drier 8 to be handed over to the air conveyor 2. It is to be understood that the unlockable gripper means provided on the second inlet wheel 24 and the second outlet wheel 26 as well as the resilient gripper means provided on the drier 8 may be constructed in a known manner.

A reject wheel 28 is disposed at a location slightly upstream of the second outlet wheel 26 for the drier 8, and includes a plurality of unlockable gripper means which are disposed at an equal circumferential interval therearound. In the similar manner as the unlockable gripper means provided on second inlet wheel 24 and the second outlet wheel 26, the unlockable gripper means on the reject wheel 28 also includes a pair of arms which grip the vessel 10 when the arms are closed and releases it when the arms are opened. However, the unlockable gripper means on the reject wheel 28 is constructed so that it can be locked open as by lock means. The unlockable gripper means on the reject wheel 28 is constructed such that during a normal production run, the unlockable gripper means on the reject wheel 28 remain locked in the open condition to pass by a reject position R, which is defined as a point of contact between the drier 8 and the reject wheel 28, but when a machine trouble occurs to stop the movement and it becomes necessary to reject the resin vessels 10 which stay within the drier 8, the unlockable gripper means on the reject wheel is unlocked to permit its arms to be opened and closed, thus allowing one of the resin vessels to be gripped at the reject position R to be removed from the resilient gripper means 11 on the drier 8.

Figure 2:
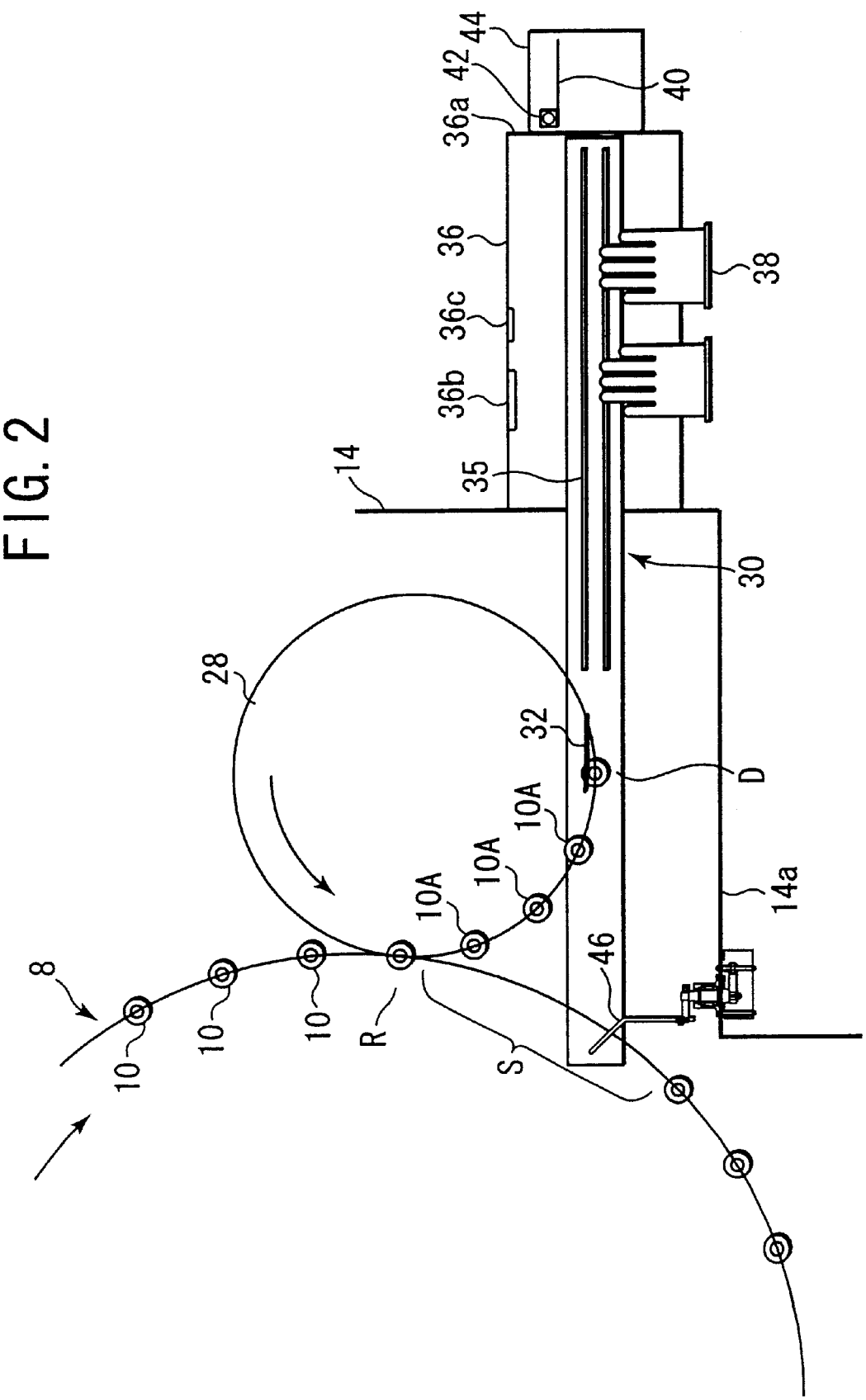
FIG. 2 is a plan view, to an enlarged scale, of part of the vessel conveying system, in particular, part relating to the rejection of the vessel.
Figure 3:
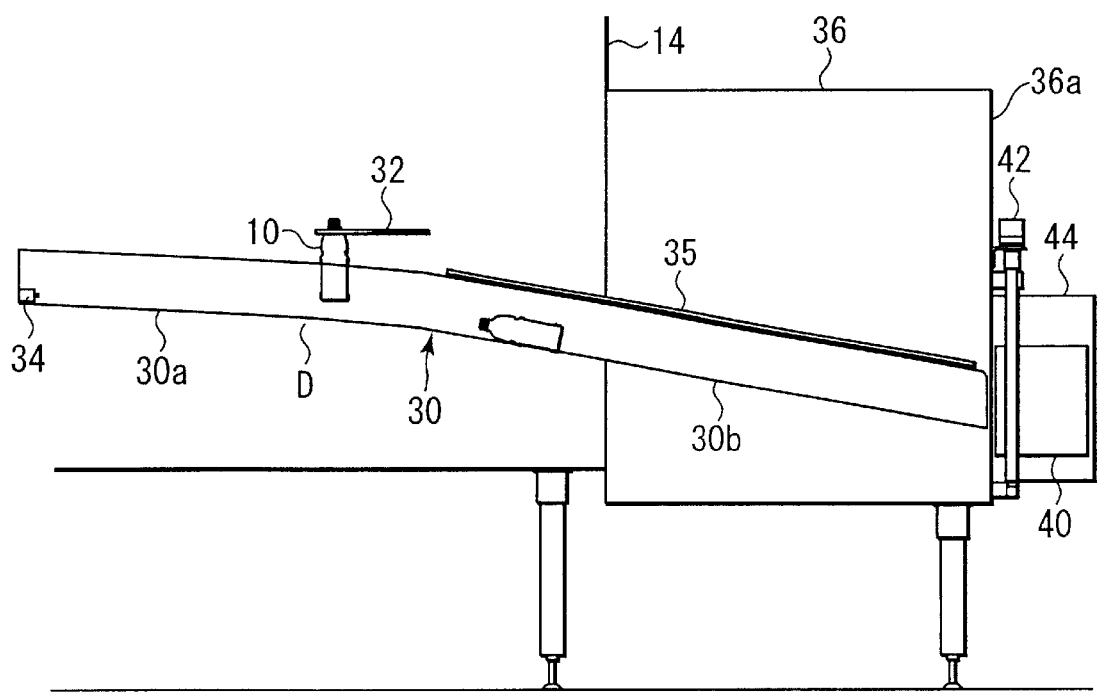
FIG. 3 is a front elevation of FIG. 2.

A discharge chute 30 is disposed laterally of and below the reject wheel 28, and the resin vessel 10 which is taken out of the drier 8 by the unlockable gripper means on the reject wheel 28 is dropped onto the discharge chute 30 to be discharged externally. As shown in FIGS. 2 and 3, a stationary reject guide 32 is disposed at the discharge position D where the reject wheel 28 overlaps the discharge chute 30, and the resin vessel 10 which is taken out by the unlockable gripper means on the reject wheel 28 is engaged with the reject guide 32 at discharge position D as the unlockable gripper means is then opened, whereby it is forcibly dropped onto the discharge chute 30.

The discharge chute 30 is gently inclined, forming a small angle with respect to the horizontal, in an upstream region 30a, extending to the discharge position D where it receives the resin vessel 10 which drops down from the reject wheel 28, and is inclined with a greater gradient in a downstream region 30b which is located beyond the discharge position D. The chute 30 comprises a bottom surface and a pair of opposite side walls to define a U-shaped space, which receives the resin vessel 10 and causes it to slip down the downstream portion 30b of a greater gradient for purpose of discharge. The upstream end of the discharge chute 30 extends to a point located below the conveying path of the resin vessel 10 which is followed by the resilient gripper means 11 on the drier 8 (see FIG. 2). A nozzle 34 is disposed at the upstream end (see FIG. 3) for blowing an air stream in the downward direction, thus blowing the dropped resin vessel 10 in the downstream direction. An anti-jump rail 35 is located above the downstream portion 30b of the discharge chute for preventing the resin vessel 10 from jumping out of the chute 30.

It is to be understood that the upstream region 30a of a smaller gradient and an upper portion of the downstream region 30b of a greater gradient of the discharge chute 30 are disposed within the sterile chamber 14 for the drier, and the lower portion of the downstream region 30b extends to the outside of the sterile chamber 14, and is then surrounded by another sterile chamber 36 for the discharge chute 30. The sterile chamber 36 is provided with gloves 38 which allow an access to the discharge chute 30 while maintaining an isolation of the chamber 36 from the exterior (see FIG. 2).

The downstream end of the discharge chute 30 extends to a point close to an end wall 36a of the sterile chamber 36, which is provided with a door 40 which can be opened and closed. The door 40 is adapted to be rotated by a rotary actuator 42 for opening and closing it. The resin vessel 10 which is carried on the discharge chute 30 is taken out by opening the door 40. The door 40 is surrounded by a cover 44. Ports 36b, 36c are formed in the side wall of the sterile chamber 36 for ventilation purpose. It is to be noted that in the present embodiment, the door 40 is maintained open during the normal production run, and is closed only when it is required to sterilize the chamber.

A reject arm 46 is disposed at a point within the drier 8 which is downstream of the reject wheel 28, but is upstream of the outlet wheel 26 for rejecting a resin vessel 10 which could not have been discharged by the reject wheel 28. As shown in FIG. 4, the reject arm comprises a pair of chevron-shaped arms 46a, 46b, which are mounted on a horizontal shaft 48 rotatably mounted in a sidewall 14a of the sterile chamber 14 by bearings 47, 49 so as to be swingable. A pair of oil seals 50, 52 are fitted over the horizontal shaft 48 both inside and outside the sterile chamber 14 to maintain a hermetic seal of the sterile chamber 14.

The end of the horizontal shaft 48 which projects externally of the sterile chamber 14 is connected through a rotating lever 54 to a piston rod 56a of a reject arm rotating cylinder 56. When the rotating cylinder 56 is actuated, the horizontal shaft 48 is driven for rotation, whereby the reject arm 46 swings up and down. When the reject arm 46 swings down, it is retracted to a position shown in phantom lines in FIG. 4 where it does not interfere with the resin vessel 10 which is being conveyed as retained by the resilient gripper means 11 on the drier 8. When the reject arm 46 swings up, it projects into the conveying path of the resin vessel 10 to be engageable with a barrel 10c of the resin vessel 10 as shown in solid lines in FIG. 4, thus permitting the resin vessel which has been conveyed within the drier 8 to be taken out from the resilient gripper means 11.

In the present embodiment, during a normal production run, the reject arm 46 is retracted to its down position. However, when the vessel processing line has stopped for a given time interval, and a reject signal is issued for rejecting resin vessels 10 which stay within the drier, the reject arm rotating cylinder 56 is actuated at a given time interval thereafter, causing the reject arm 46 (arms 46a, 46b) to swing upward, thus causing it to project into the conveying path of the resin vessel 10 in the drier 8.

Figure 1:
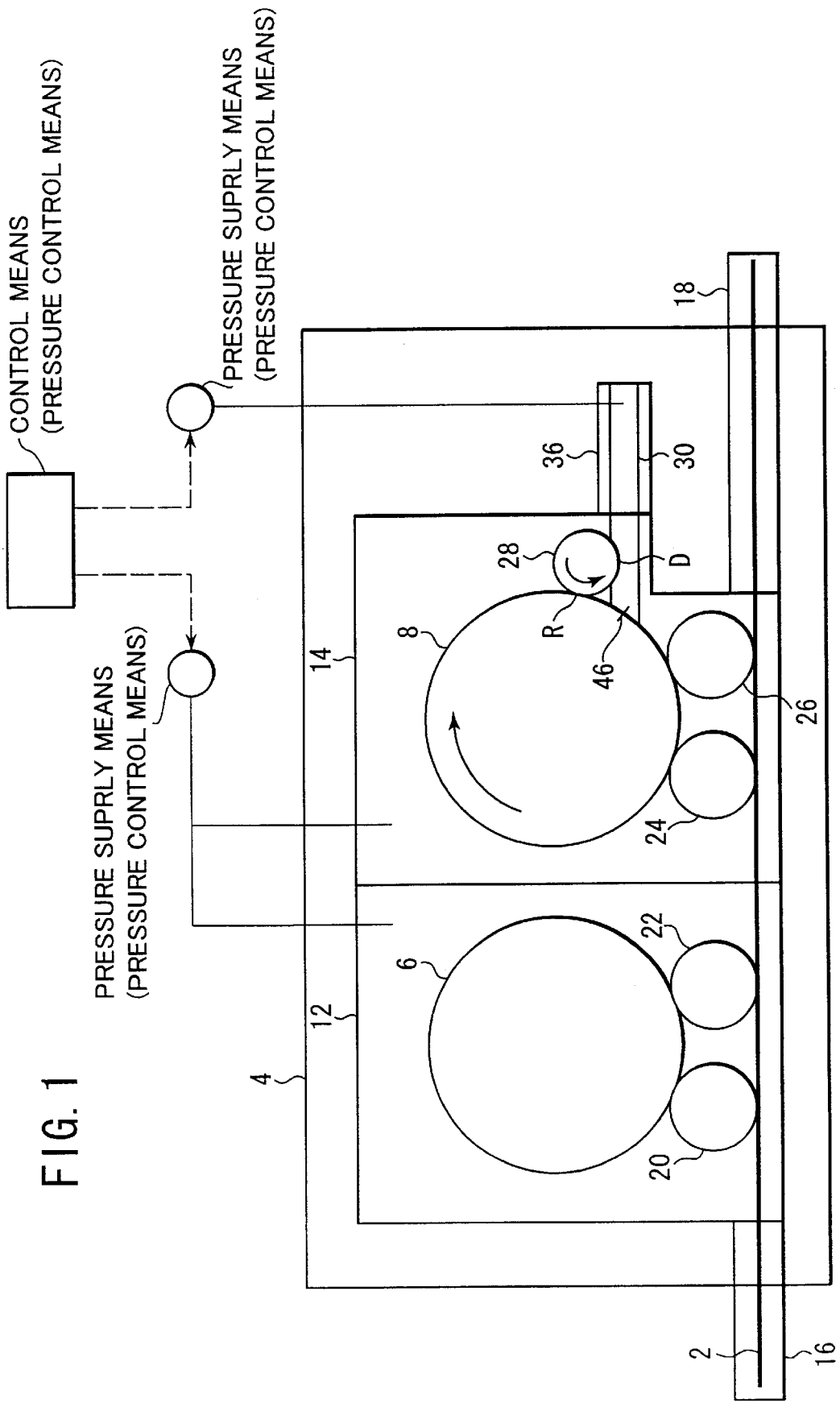
FIG. 1 is a simplified plan view of the entire arrangement of a vessel conveying system according to one embodiment of the present invention.

There is provided pressure control means (including control means and pressure supply means, see FIG. 1) which control the pressures within the sterile rinser chamber 12, the sterile drier chamber 14 and the sterile discharge chute 36, and operates to maintain the pressures in the sterile rinser chamber 12 and the sterile drier chamber 14 to be higher than the pressure in the processing chamber 4 (which is the atmospheric pressure), and to maintain the pressure in the sterile discharge chute chamber 36 to be lower than the pressure in the processing chamber 4.

The operation of the vessel conveying system mentioned above will now be described. Resin vessels 10 which are conveyed on the air conveyor 2 while the lower surfaces of their flanges 10b are supported by the conveyor are supplied into the rinser 6 located within the sterile chamber 12 through the inlet wheel 20. After being rinsed by the rinser 6, the resin vessels 10 are handed over to the air conveyor 2 again through the outlet wheel 22. The resin vessels 10 carried on the air conveyor 2 are then supplied into the drier 8 disposed within the sterile chamber 14 through the second inlet wheel 24. As mentioned previously, the second inlet wheel 24 carries a plurality of unlockable gripper means, each of which can be opened and closed to grip one of the resin vessels 10. In this manner, the unlockable gripper means grips one of the resin vessels 10 and hands it over to the drier 8.

The drier 8 includes resilient gripper means 11, each operating to hold a resin vessel 10 sandwiched under the resilience of a spring, for example, and the resin vessels 10 which are handed over from the second inlet wheel 24 are conveyed while one of the vessels is gripped by the resilient gripper means 11. In the present embodiment, the unlockable gripper means on the second inlet wheel 24 grips an upper portion of the resin vessel 10 located above the flange 10b while the resilient gripper means 11 on the drier 8 grips a lower portion of the resin vessel 10 located below the flange 10b around the neck 10a.

During a normal production run, the unlockable gripper means on the reject wheel 28 are locked to be always in an open condition, and accordingly, the resin vessel 10 which is gripped by the resilient gripper means 11 on the drier 8 simply passes by the reject position R and is then handed over to the air conveyor 2 through the second outlet wheel 26. Subsequently, the resin vessel is conveyed on the air conveyor 2 to be delivered from the processing chamber to a subsequent step.

In the event the vessel processing line stops for a given time interval as by a failure or the like, there is a likelihood that the resin vessels 10 which are already conveyed in the sterile chamber 14 may be deformed under heat and cannot be used to provide products. Accordingly, all of the resin vessels 10 which are retained by the resilient gripper means 11 must be rejected by the operation of the reject wheel 28. In response to a reject signal which commands the initiation of a reject operation for the resin vessels, the unlockable gripper means on the reject wheel 28 are unlocked to permit their opening and closing, and become opened and closed at given positions as the wheel rotates. Specifically, the unlockable gripper means has its both arms open until the reject position R is reached, and as the reject position R is approached, the resin vssel which has been retained by the resilient gripper means on the drier 8 is inserted between the both arms, whereupon the both arms are closed together by the action of a cam, for example, thus gripping the resin vessel 10. Subsequently, as both the drier 8 and the reject wheel 28 continue to rotate and the resilient gripper means 11 on the drier 8 which retains the resin vessel 10 and the unlockable gripper means on the reject wheel 28 which also retains the same vessel move apart, the resin vessel 10 is extracted from the resilient gripper means 11 on the drier 8 and is solely retained by the unlockable gripper means on the reject wheel 28.

When the resin vessel 10 which is retained by the unlockable gripper means on the reject wheel 28 moves to a position above the discharge chute 30 (or the discharge position D), the unlockable gripper means is opened and the stationary reject guide 32 drops the vessel onto the discharge chute 30. The air blowing nozzle 34 is disposed at the upstream end of the discharge chute 30, and accordingly, the resin vessel 10 which is dropped onto the discharge chute is blown toward the downstream portion 30b of the discharge chute 30 while slipping along the discharge chute 30. The anti-jump rail 35 is disposed above the downstream portion 30b of the discharge chute 30, preventing the resin vessel 10 from jumping out of the discharge chute 30 as it is blown off.

At a given time interval after the reject signal is input which initiates the reject operation, the reject arm rotating cylinder 56 is actuated, whereby the reject arm which has been retracted at its position which is out of the conveying path of the resin vessel 10 swings upward to project into the conveying path. It will be appreciated that if the reject arm 46 is operated to swing immediately upon receiving the reject signal, the reject arm would collide with the resin vessels 10 which are being conveyed within the drier 8, but those resin vessels 10 which are positioned close to the reject wheel 28 are subject to less deformation if they are deformed, and thus can be positively gripped and discharged by the unlockable gripper means on the reject wheel 28 (see resin vessels designated by reference character 10A in FIG. 2). Thus, during the given time interval which precedes the actuation of the cylinder 56, there is a space S downstream of the reject wheel 28, and the reject arm 46 can be moved into the space S (see FIG. 2).

As mentioned previously, when the resin vessel 10 continue to be heated for a long time while it remains at rest, not only the barrel 10c, but the neck 10a of the vessel 10 may also be largely deformed. Such resin vessel 10 cannot be grasped by the unlockable gripper means on the reject wheel 28, and thus would be conveyed downstream of the reject wheel 18 while being retained by the resilient gripper means 11 on the drier 8. However, when there is the reject arm 46 which projects into the conveying path, such resin vessel 10 will be forcibly taken out from the resilient gripper means 11 to be dropped onto the discharge chute 30. The resin vessel 10 dropping onto the discharge chute 30 is blown off by the air nozzle 34 to slip down the discharge chute 30.

It will be seen that in the arrangement of the present embodiment, the provision of the reject arm 46 downstream of the reject wheel 28 allows any resin vessel which may have been severely deformed up to its neck 10a as a result of prolonged heating can be positively rejected if it has passed the reject position R as a result of a failure of the reject wheel 28 to reject it. In this manner, defective vessels 10 cannot continue to be conveyed on the vessel processing line. In addition, there is no need for a manual intervention to remove defective vessels 10.

In addition, because the discharge chute 30 which receives and discharges the rejected resin vessels 10 is constructed as a cage-like structure in which the vessels are dropped and discharged, it is assured that even a resin vessel 10 having a deformed neck 10a can be positively slipped down to be discharged.

The resin vessel 10 which has slipped down to the downstream end of the discharge chute 30 is taken out by opening the door 40 mounted on the chamber 36 which is provided separately for the discharge chute. The pressure within the sterile drier chamber 14 is controlled to be higher than the pressures in the processing chamber 4 and the sterile discharge chamber 36, preventing the ingress of an external ambience into the sterile chamber 14 and also preventing the ambience within the chamber 14 form being destroyed as the rejected vessels 10 are taken out. In addition, the pressure within the discharge chute chamber 36 is controlled to be lower than the pressure in the external processing chamber 4, thus preventing the ambience within the sterile drier chamber 14 and any upstream sterile rinser chamber 12 from being released into the outer processing chamber 4 through the discharge chute chamber 36. Accordingly, if a substance which is hazardous to human beings or which should not be released into an external atmosphere is used in the sterile chambers 12, 14, the release of the ambience within the chambers 12, 14 to the outside through the discharge chute chamber 36 is avoided.

In addition, because the rejected vessel 10 can be taken out through the discharge chute chamber (or second chamber 36) without opening the drier chamber (first chamber 14) in which the reject wheel 28 is disposed, the vessels 10 can be taken out without destroying the sterile ambience within the drier chamber 14. If a trouble occurs on the discharge chute 30, the trouble can be accommodated for by using the gloves 38 which provide an access to the vessels on the discharge chute 30 while maintaining the chute isolated from the exterior.

While the described embodiment relates to a conveying system for resin vessels such as PET bottles, it should be understood that the invention is not limited in it use to resin vessels, but is equally applicable to other vessels.

What is claimed is:

1. A vessel conveying system including a rejecting apparatus for selectively discharging a vessel at a reject position defined in the course of a conveying path for vessels, comprising:

a discharge chute for receiving a vessel which is discharged from the conveying path by the rejecting apparatus and conveying the vessel downstream;

a first chamber surrounding the rejecting apparatus;

a second chamber extending externally from the first chamber and surrounding a downward portion of the discharge chute, the second chamber including a glove for bringing into contact with the discharge chute while maintaining its sterile condition and a door capable of being opened and closed to discharge a vessel through the downstream end of the discharge chute; and a pressure controller for controlling pressures within the first and the second chamber, the pressure controller controlling the pressure within the first chamber to be greater than the pressure which prevails outside the first and the second chamber and controlling the pressure within the second chamber to be lower than the pressure which prevails outside the first and the second chamber.

2. The vessel conveying system according to claim 1 in which the rejecting apparatus comprises a reject guidewhich engages the vessel to drop the vessel onto the discharge chute in a forcible manner.

3. The vessel conveying system according to claim 1, further comprising a nozzle disposed in an upstream portion of the discharge chute for blowing an air stream in a downward direction.

4. The vessel conveying system according to claim 1, further comprising an anti-jump rail disposed above the discharge chute for preventing a vessel moving along the discharge chute from jumping out of the chute.

5. The vessel conveying system according to claim 1, further comprising a reject arm disposed downstream of the rejecting apparatus for rejecting a vessel that the rejecting apparatus fails to reject.

6. The vessel conveying system according to claim 5, wherein the reject arm is movable between a position engageable with a vessel traveling on the conveying path and a position that does not interfere with a vessel traveling on the conveying path.

7. The vessel conveying system according to claim 6, wherein the reject arm is moved to the position engageable with a vessel on the conveying path at a given time interval after a signal initiating a reject Operation is input to the rejecting apparatus.

* * * * *

UNITED STATES PATENT AND TRADEMARK OFFICE
CERTIFICATE OF CORRECTION

PATENT NO.    : 6,652,199 B2
DATED         : November 25, 2003
INVENTOR(S)   : Kazuo Miyazaki et al.

It is certified that error appears in the above-identified patent and that said Letters Patent is hereby corrected as shown below:

<u>Column 8,</u>
Line 41, replace "guidewhich" with -- guide which --.
Line 64, replace "Operation" with -- operation --.

Signed and Sealed this

Twenty-fifth Day of May, 2004

JON W. DUDAS
*Acting Director of the United States Patent and Trademark Office*